United States Patent
Augst

(10) Patent No.: US 8,754,760 B2
(45) Date of Patent: Jun. 17, 2014

(54) METHODS AND APPARATUSES FOR INFORMING AN OCCUPANT OF A VEHICLE OF SURROUNDINGS OF THE VEHICLE

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 738 days.

(21) Appl. No.: 13/009,231

(22) Filed: Jan. 19, 2011

(65) Prior Publication Data

US 2011/0175752 A1   Jul. 21, 2011

Related U.S. Application Data

(63) Continuation of application No. PCT/EP2009/005231, filed on Jul. 18, 2009.

(30) Foreign Application Priority Data

Jul. 25, 2008 (DE) .......................... 10 2008 034 594

(51) Int. Cl.
*B60Q 1/00* (2006.01)
(52) U.S. Cl.
USPC ............................ 340/435; 340/903; 348/148
(58) Field of Classification Search
CPC .................. B60R 2300/302; B60R 2300/806; B62D 15/0275; B62D 15/028; G08G 1/16
USPC ............... 340/932.2, 903, 435; 348/148, 149; 382/104
See application file for complete search history.

(56) References Cited

U.S. PATENT DOCUMENTS

| | | | |
|---|---|---|---|
| 6,222,447 B1 | 4/2001 | Schofield et al. | |
| 6,476,855 B1 | 11/2002 | Yamamoto | |
| 6,580,373 B1* | 6/2003 | Ohashi | 348/148 |
| 7,058,207 B2* | 6/2006 | Iida et al. | 382/104 |
| 2001/0019356 A1* | 9/2001 | Takeda et al. | 348/148 |
| 2003/0085999 A1* | 5/2003 | Okamoto et al. | 348/148 |
| 2005/0270374 A1* | 12/2005 | Nishida et al. | 348/148 |
| 2006/0187238 A1 | 8/2006 | Yoneji | |
| 2006/0293800 A1 | 12/2006 | Bauer et al. | |
| 2007/0041659 A1 | 2/2007 | Nobori et al. | |
| 2007/0085901 A1* | 4/2007 | Yang et al. | 348/148 |

(Continued)

FOREIGN PATENT DOCUMENTS

| | | |
|---|---|---|
| DE | 199 23 964 C2 | 9/2003 |
| DE | 10 2004 008 928 A1 | 9/2005 |

(Continued)

OTHER PUBLICATIONS

International Search Report dated Oct. 6, 2009 with English translation (six (6) pages).

(Continued)

*Primary Examiner* — Thomas Mullen
(74) *Attorney, Agent, or Firm* — Crowell & Moring LLP

(57) ABSTRACT

Methods and apparatuses for informing an occupant of a vehicle of surroundings of the vehicle are provided. A recording unit of the vehicle generates at least two images, which contain different road sections of a road plane in the surroundings of the vehicle. The at least two images are processed by an image processing unit, which generates a depiction in which the at least two images are imaged on a virtual road plane that is displayed in perspective. The depiction is displayed on a display unit in the interior of the vehicle.

20 Claims, 11 Drawing Sheets

(56) References Cited

U.S. PATENT DOCUMENTS

| | | |
|---|---|---|
| 2008/0310680 A1 * | 12/2008 | Azuma .................. 382/104 |
| 2009/0273674 A1 | 11/2009 | Russ et al. |
| 2010/0013670 A1 | 1/2010 | Hueppauff et al. |

FOREIGN PATENT DOCUMENTS

| | | |
|---|---|---|
| DE | 10 2006 007 493 A1 | 8/2006 |
| DE | 10 2005 034 700 A1 | 2/2007 |
| DE | 10 2006 036 933 A1 | 2/2008 |
| DE | 10 2006 052 779 A1 | 5/2008 |
| EP | 1 158 804 A2 | 11/2001 |
| EP | 1 179 958 A1 | 2/2002 |
| EP | 1 462 762 A1 | 9/2004 |

OTHER PUBLICATIONS

German Search Report dated Apr. 30, 2009 with partial English translation (nine (9) pages).

* cited by examiner

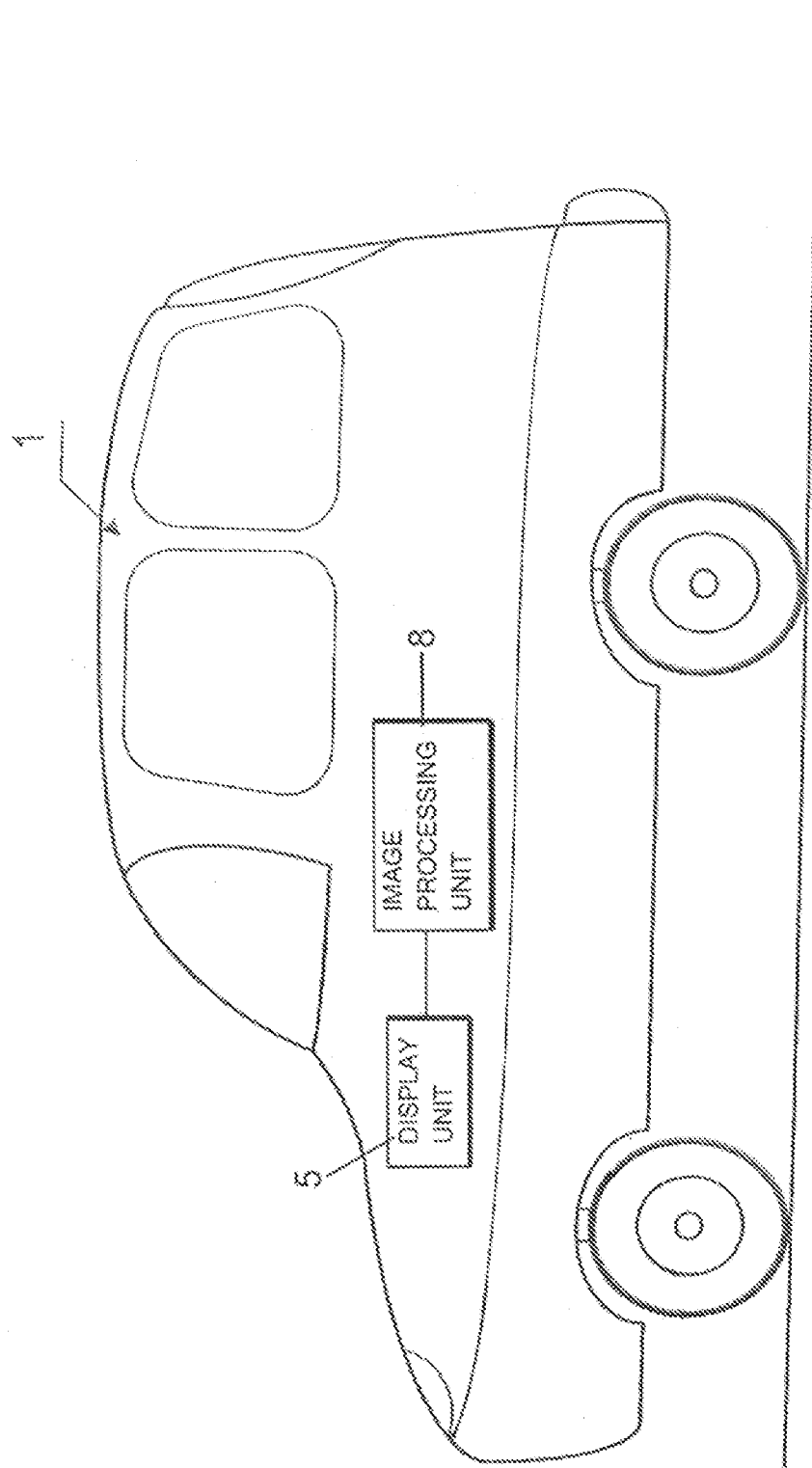

METHODS AND APPARATUSES FOR INFORMING AN OCCUPANT OF A VEHICLE OF SURROUNDINGS OF THE VEHICLE

CROSS-REFERENCE TO RELATED APPLICATIONS

This application is a continuation of PCT International Application No. PCT/EP2009/005231, filed Jul. 18, 2009, which claims priority under 35 U.S.C. §119 from German Patent Application No. DE 10 2008 034 594.6, filed Jul. 25, 2008, the entire disclosures of which are herein expressly incorporated by reference.

BACKGROUND AND SUMMARY OF THE INVENTION

Methods and apparatuses consistent with the present invention relate to informing at least one occupant of a vehicle, such as a motor vehicle, of the surroundings of the vehicle. The recording means of the vehicle generate at least two images, which contain different road sections of the road plane in the surroundings of the vehicle, and the at least two images are processed by an image processing unit and are displayed on a display unit in the interior of the vehicle.

Methods that are intended for informing the driver and that display a plurality of images of road sections in the vehicle's surroundings on a display unit are known from the related art. The document DE 10 2006 036 933 A1 shows such a method, wherein a plurality of individual images of the vehicle's surroundings that are recorded by the vehicle's cameras are suitably transformed in order to generate a composite picture that reproduces on a display unit, in a bird's eye perspective, the contour of the vehicle and suitably assembled individual images of the vehicle's surroundings.

The document DE 10 2006 007 493 A1 discloses a device for seeing the periphery of a vehicle, wherein an imaging camera captures the horizontal front region in the front region of the vehicle and also a vertical region in front of and behind the vehicle. The regions are assembled into a panorama image of the front surroundings of the vehicle in a display unit. In this process the vehicle region in front of the vehicle is distorted in a convex manner, in order to generate a suitable perspective with the use of this method.

The related art methods for informing the driver have the drawback that the camera often records a number of images that contain different regions of the surroundings of the vehicle, but these images cannot be suitably displayed in a single depiction on a display unit in the vehicle interior. Especially for the purpose of recording the immediate near field, it is necessary to have a plurality of cameras owing to the shape of the vehicle. It is often the case that the user cannot correctly assign the individual images to the real surroundings. It is difficult for the user to understand the actual positions of the objects that are imaged in one or more images.

Therefore, an object of the invention is to provide a method, system, and/or vehicle for informing the at least one vehicle occupant of the surroundings of the vehicle by generating a depiction of different regions in the vehicle's surroundings in such a way that the depiction is easy for the occupant to understand.

According to embodiments of the invention, the recording means of the vehicle generates at least two images, which contain different road sections of the road plane in the surroundings of the vehicle. By "different road sections of the road plane" is meant those road sections that are generated, in particular, with a variety of recording means that are provided at different installation sites in the vehicle and/or correspond to various views relative to the vehicle's orientation, such as from the top, from the side, and/or rearwards. It involves, in particular, regions of the vehicle's surroundings that depict the parts of the road and, if desired, the objects on said road in such a way that the parts of the road do not overlap at least in a subarea (do not overlap at all or overlap just slightly).

By "recording means" is meant one or more devices that depict in graphic form a segment of the vehicle's surroundings for the driver of the vehicle and are technically capable of implementing the features of embodiments of the invention. Devices that can provide a segment of the vehicle's surroundings in the form of an image that can be shown to the driver are subsumed under the term "imaging device" within the scope of this application. Imaging devices in this context include both those that are based on camera images (including, for example, images recorded in the infrared wavelength range) and also those that are based on synthetic images generated by means of a computer (for example, from sensor data). These images can be generated, for example, by scanning the surroundings by means of a radar device, a lidar device, ultrasonic sensors and/or clusters of such sensors or similar recording means. In particular, the images can contain both a portion of the vehicle's surroundings and also artificially generated graphics, which are synthesized, for example, by means of sensor data and/or symbolic graphics.

Even such cases in which images are generated in real time on the basis of scanning the surroundings are included under the concept "generation of at least two images with the use of recording means" that is used herein. An imaging device in the above sense can also include a plurality of cameras and/or other sensors, of which the images are stitched together to form a single image. By the term "image" is meant not only a static image representing a single recording of the surroundings, but also a dynamically changing image in the form of a video stream composed of consecutive images, for example, in the form of an MPEG video stream or a sequence of complete images.

In the method according to embodiments of the invention, the at least two images are processed by means of an image processing unit and displayed on a display unit in the vehicle interior. In this context the display unit can comprise any device with which the images can be visually displayed, such as flat screen displays, heads-up displays, 3D displays, and (3D) projection devices. In a preferred variant the display unit is a central vehicle display. The term "vehicle" can be defined, for example, as a motor vehicle, an airplane, a watercraft or amphibian craft. Correspondingly the term "road section" can also be defined, for example, as the water surface or portions of a landing strip.

The method according to embodiments of the invention is characterized in that a depiction comprising a virtual road plane is generated. In this case at least two images are imaged on the virtual road plane, and the virtual road plane is displayed in perspective, wherein the perspective display is generated preferably by means of the limiting shape of the virtual road plane and/or the arrangement of at least two images in relation to each other.

In this context the term "virtual road plane" is defined in such a way that the perspective of the virtual road plane does not match the perspective of the recording means and, in particular, does not originate from the content of the images, but rather is generated only by means of the method according to embodiments of the invention, in particular by means of a depiction of the virtual road plane in a suitable form and arrangement of the images in relation to each other. The at least two transformed images are imaged essentially on a virtual road plane. In other words the virtual road plane is depicted as a plane that is tilted in perspective. The perspective of said plane does not match the perspective of the recording means. In this case the virtual road plane communicates to the at least one occupant of the vehicle the principle direction of the road that is seen from a specific perspective.

Working on this basis, the term "perspective display of the virtual road plane" is defined in such a way that the virtual road plane is depicted three-dimensionally or quasi-three-dimensionally in a specific perspective or a perspective that is determined according to specific criteria, so that the viewer has a three-dimensional spatial impression, especially with respect to the spatial orientation of the virtual road plane. In particular, the perspective depictions include such depictions with which the parts of a virtual plane are perceived as lying at different depths in relation to the display area of the display unit and/or are differently oriented in relation to said display area. Thus, a perspective display in this sense does not include a display without a spatial impression, such as depictions in a top view.

The method according to embodiments of the invention has the advantage that the arrangement and the position of the individual road sections in the surroundings of the vehicle can be understood in a fast and intuitive way by the driver by means of a quasi-three-dimensional depiction. In this case a depiction that is especially comprehensible is one in which the perspective of the displayed virtual road plane corresponds essentially to the orientation of the actual road plane, which could be seen by the driver of the vehicle if his vehicle were transparent, for example, towards the side.

The depiction of a virtual road that corresponds to the user's perception running diagonally downwards to the front, especially in a perceived viewing angle range between 30° and 60° between the viewing direction and the virtual road plane, is especially advantageous. In addition, this feature permits very good use of the display area of a conventionally shaped, horizontally extended vehicle display. The depiction allows an adequately detailed imaging of the regions that otherwise could not be displayed, for example, on a conventional vehicle screen exhibiting a side ratio of 9:16, without being unnaturally shrunk.

In this context the perspective display can be enhanced by means of an additional reference figure, for example, a frame and/or an additionally generated and depicted 3D action graphics imaging, which is displayed by the display unit. The reference figure can be constructed in such a way that it identifies the expansion and/or orientation of the virtual space. In this way the reference figure helps the user with the orientation and reinforces the spatial perception of the rest of the depiction.

It is especially advantageous if at least two images, which essentially capture a road plane and/or objects located on a road plane from a variety of installation sites on the vehicle and/or which are oriented differently in relation to the coordinate system of the vehicle, are imaged on this virtual road plane or portions thereof. In this case it is advantageous for the user if the virtual road plane has a different perspective orientation than the recording means. This feature allows the user to interpret the images correctly.

It is especially advantageous if the at least two images are imaged on the virtual road plane by means of a geometric transformation, which is applied in such a way that the transformation of the at least two images corresponds essentially to the perspective in which the virtual road plane is depicted. In this process the image can be formed by means of an imaging function determined by the method of embodiments of the invention, and/or by means of an allocation table for the individual image regions and/or pixels, and/or by means of methods that are known from the related art. The allocation table can determine the shift of certain representative points of the original image to the corresponding points of the transformed image. The points of the imaging that lie in-between can be determined by means of a position determined by an interpolation process. The transformation is designed preferably in such a manner that the distances between the points of the transformed images are in such a ratio to each other as they would be seen from a certain viewing point.

The delimiting form of the virtual imaging plane and/or the delimiting forms of individual images imaged thereon can take place with the use of a so-called mask, for example, through the selection of a pixel region of the transformed image that is imaged on the virtual plane. As an alternative or in addition, the delimiting form can also be generated by a selection of the image regions from the whole region, which can recorded by the recording means. The delimiting form can be depicted, for example, by means of a sudden or soft transition between the imaging of the transformed image and the background, and can be additionally reinforced by depicting a graphical frame for the virtual plane and/or for the individual transformed images imaged thereon.

A transformation of the images that is especially advantageous is a transformation in which the change in size of the images of the road sections in the event of a moving vehicle corresponds approximately to the perceived change in the size of these road sections that is perceived by a person looking directly at these road sections from a similar perspective and movement. Thus, when the vehicle is in motion (for example, during a parking maneuver), the images of the textures of the road (for example, paving stones or objects lying on the road) behave with respect to the viewer in the interior of the vehicle approximately as if the driver were to see them through the side regions of his vehicle.

Especially when the vehicle is in motion, the method according to embodiments of the invention offers an advantage over the related art flat top view depiction, where the imaging of the side regions of the vehicle is rotated by 90° in relation to the direction of travel.

The method according to embodiments of the invention is especially advantageous if the at least two images contain separate road sections without mutual overlapping.

Preferably the at least two images contain in each case a road section laterally next to the vehicle and/or behind the vehicle and/or in front of the vehicle. In this case the road sections are recorded with suitable imaging devices and are displayed as a single composite image on the display unit. This process provides the option of displaying in a simple and intuitive way the whole surrounding area around the vehicle in a three-dimensional or quasi-three-dimensional depiction on the display unit.

Preferably the control of the image parameters of the images from a variety of recording means (for example, the exposure control, the histogram operations, and/or the white balance) is designed in such a way that at least one image parameter of an image from the recording means depends on the scene parameters of a different image of another recording means.

In particular, the images from different recording means can be subjected to such a histogram operation that the major integral features of their histograms, especially luminosity and/or RGB histograms, are essentially adjusted to each other. Thus, for example, such a brightness/contrast and/or white balance control is reached that enables an essentially uniform perception of the color temperature of the individual images in the whole depiction. In this way it is possible to achieve, in particular, a conformity with respect to the human perception of these images, producing a state that makes it easier to interpret the images and additionally offers an aesthetic advantage.

Preferably the images from the different recording means are synchronized among each other, especially by the control and/or cycling operations from the image processing unit. In this way it is possible to achieve a conformal imaging of the objects on the road that expands, for example, from one image to another, especially when the vehicle is moving.

In an additional, especially preferred embodiment of the method according to the invention, the generated depiction is constructed in such a way that the positions of the parts of the vehicle's surroundings can be seen in relation to the vehicle and/or to specific parts of the vehicle. By this procedure the driver recognizes immediately by looking at the display unit, at which points in the surroundings of his vehicle the depicted road sections are located, without having to perform an analytic allocation of the individual road sections, for example, by means of his knowledge of the installation sites of the individual recording means on the vehicle and their orientation. The depiction can be provided with a superimposed scale and/or markings, preferably equidistant markings, which are perceived to be located above the virtual road plane preferably in the perception of the occupant of the vehicle.

In another, especially preferred embodiment of the method according to the invention, the generated depiction contains a vehicle model. In this case the perspective in which the vehicle model is depicted corresponds essentially to the perspective of the virtual road plane, wherein both perspectives correspond preferably to the same virtual viewing point, and the position of the vehicle model relative to the virtual road plane corresponds essentially to the actual position of the vehicle relative to the road. Preferably the imaging factor of the road sections imaged on the road plane coincides with the imaging factor of at least the bottom part of the vehicle with respect to its length in the direction of travel of the vehicle. In this way the occupant of the vehicle can always recognize the perspective in which the vehicle's surroundings are depicted by the method of embodiments of the invention, by means of the perspective of the depicted vehicle model.

The vehicle model can also be constructed as three-dimensional action graphics that depict the actual vehicle. In this case the spatial orientation of the model can be recognized, in particular, by the position of the outer edges of the model and/or by the imaging of typical design elements of the vehicle. The perspective imaging of the vehicle model does not contain a top view or a frontal view of the vehicle from the rear or from the front. The vehicle model can contain highly accentuated edges, in particular outer edges, preferably such edges that enhance the three-dimensional effect of the graphics. The vehicle model can display at least symbolically the special properties of the vehicle, such as color, model-specific features, etc.

The virtual road plane can be complemented in an advantageous manner with at least one additional virtual plane on which a part of the vehicle's surroundings is imaged and which is depicted as standing perpendicularly especially to the virtual road plane. To this end the imaged part of the vehicle's surroundings is captured with recording means on the vehicle and can contain any region of the vehicle's surroundings. The imaging of the part of the vehicle's surroundings on the at least one additional virtual plane takes place once more preferably by means of a geometric transformation, which is applied in such a way that the transformation of the part of the vehicle's surroundings corresponds essentially to the perspective in which the at least one additional virtual plane is depicted. Preferably regions of the vehicle's surroundings that are captured in essence from a different perspective than that of the at least two images, which are displayed in the virtual road plane, are depicted on these additional virtual planes. These images can come, in particular, from recording means that are installed at a different point on the vehicle. By this process a kind of virtual space is constructed for the viewer that depicts the surroundings of the vehicle by means of a plurality of perspectives, where the depiction mode contains the information about the respective perspectives.

Preferably the image(s) displayed in the at least one additional virtual plane contain the front and/or rear and/or side surroundings of the vehicle captured in perspective.

Preferably the reference of the virtual planes (the at least one additional virtual plane and/or the virtual road plane) the points of the vehicle where the recording means are located is highlighted in graphic form. This feature can be achieved, in particular, by positioning the virtual planes inside the depiction, especially relative to the vehicle model. As an alternative or in addition, this goal can be achieved, for example, with connecting lines that are superimposed on the depiction and produce a connection between the parts of the vehicle model and the virtual planes, in particular, their corner points. In this way even a new user can be absolutely sure to correctly interpret the depiction.

Preferably the method is designed in such a way that the at least one additional virtual plane and the virtual road plane are depicted in such a perspective correlation to each other and/or to the vehicle model that the perspective correlation corresponds essentially to the perspective correlation in the real vehicle surroundings, in particular in relation to a predetermined viewing point. In this way the occupant of the vehicle can assign the views with respect to certain areas of the vehicle's surroundings, which are imaged on the virtual planes, to the real spatial realities by means of perspectives that are easy to recognize and interpret, and from which the vehicle is depicted.

In another preferred embodiment of the method according to the invention, the perspective in which the virtual road plane and/or the at least one additional virtual plane are displayed is changed as a function of the current odometric data of the vehicle (for example, the speed, the steering angle, etc. of the vehicle) and/or as a function of the recognized driving intention of the driver. The change can relate to the perspective of all virtual planes. In this case the correlation between the individual perspectives among each other is essentially retained. The corresponding necessary adaptation of the perspectives of the virtual road plane and, if desired, other virtual planes can be achieved by changing the shape and/or orientation of the corresponding planes, along with the concomitant change of the imaging function of the respective image to the corresponding plane.

For this purpose, the driving intention of the driver can also be recognized by means of the evaluation of the vehicle data, such as the currently engaged gear or the position of the gear shift setting (e.g., reverse gear, forward gear, parking position) and/or by means of the automatic evaluation of the driver's behavior. The evaluation of the driver's behavior can include, for example, the operating action last performed by the driver or special combinations of operating actions. As an alternative or in addition, the driving intention of the driver can also be recognized by the variation in his viewing direction, such as by means of eye tracking.

In another, especially preferred embodiment of the invention, the generated depiction is changed as a function of the traffic situation, which is recorded or detected preferably by means in the vehicle, such as with the aid of a navigation system or by means of an automatic sensor-based evaluation of the situation. A predetermined event can be, for example, the appearance of an obstacle in the surroundings of the vehicle. In this case the obstacle is detected by means of an imaging device, in particular, by means of a surround sensing system that captures the topography of the surroundings. Furthermore, predetermined events can comprise the wireless reception of signals of road users or other objects.

Conceivable is, for example, a change in the generated depiction as a function of the known and/or automatically determined sources of danger or other road users. The necessary previous knowledge of known sources of danger can come, for example, from an electronic road map. It can also be acquired in a wireless manner from a service provider. The presence and optionally the exact position and/or other data of road users can be made known to the vehicle, for example, by means of vehicle-to-vehicle communication and/or vehicle-to-infrastructure communication.

An object in the surroundings of a vehicle can also be detected, because the vehicle has a radio frequency identification (RFID) chip or a similarly detectable feature. Such an object that is identified on an RFID basis can be depicted, for example, in a camera image or in an image that is artificially generated on the basis of an ultrasonic-based detection of the surroundings.

If another road user, in particular another vehicle and/or a pedestrian, is provided with an RFID chip or other wireless communication means, then this road user can also be detected and localized on the basis of a detection of this chip by the motor vehicle.

Thus, the virtual viewing direction can be changed automatically, for example, in the direction of the relevant object. In this case the depiction can be automatically adjusted, for example, as a function of a hazardous potential, in particular, the hazardous potential of a collision that can be attached to an object (for example, a road user in the current driving situation) in such a way that the generated depiction includes this object (for example, the road user) and/or shows the object from a different perspective. The perspective can be selected in such a way, for example, that the visibility of the object and/or the driver's orientation option is improved.

In addition to other road users, other objects and states of the vehicle surroundings can also be automatically detected on the basis of the acquisition of information from the RFID chip, and can cause the depiction according to embodiments of the invention to change automatically. Conceivable is, for example, an RFID based detection and, if desired, localization of traffic signs, intersections, junctions, entrances, street lights and parking opportunities. Even as a function of such objects and their arrangement with respect to the motor vehicle, the virtual viewing angle of the depiction can be adjusted in a situation-dependent manner, so that the perspective correlation between the individually depicted regions of the vehicle's surroundings stays the same.

The RFID detection can also concern objects that do not directly relate to the driving action, but rather serve commercial purposes and/or belong to the general infrastructure, such as mailboxes, free parking spaces, parking ticket machines, restaurants, vending machines, etc. The generated depiction can also be adjusted as a function of the situation in such a way that such objects are shown to the driver from, for example, a previous perspective. Thus, an object, such as a free parking space, can be shown to the driver in the vehicle's surroundings, especially in a three-dimensional relationship with the model of his vehicle that is depicted in perspective.

In addition to adapting the generated depiction subject to the influence of an RFID chip, at least one information item that is read out of the respective RFID chip and relates to the object, provided with the RFID chip, or its current state can also be displayed by means of the display unit provided according to embodiments of the invention. Instead of the display of the information by the display unit, it is self-evident that the display of the information can also be induced by an additional information communicating unit. The generated depiction can be adjusted, as aforementioned, in such a way that the driver is shown a free parking space in the depicted segment of the surroundings. In addition, it is possible to show the parking fees for the use of the parking space (for example, superimposed on the image of the segment of the surroundings or at another point in the vehicle interior) as additional information read out of the RFID chip.

One embodiment of the invention changes the generated depiction in such a way that the virtual viewing angle generated by the depiction with respect to the virtual road plane and/or the at least one additional virtual plane is changed, but the perspective relations of the images contained in the depiction remain unaffected. To this end, an especially preferred embodiment changes the generated depiction in such a way that the perspective display of the vehicle's surroundings is rotated and/or tilted, in particular about an axis that runs vertically to the virtual road plane. This process makes it especially easy to depict a view of the vehicle's surroundings that corresponds to a movement around the vehicle that is simulated, for example, from a height that equals the size of a human.

Furthermore, an additional, especially preferred embodiment of the invention designs the generated depiction in such a way that a binocularly perceived depth effect in the depiction of the virtual planes is generated. In particular, each portion of the road plane and/or optionally the additional virtual planes is assigned the perceivable depth that corresponds to the above-defined criteria by means of the perspective orientation. The display of a depiction determined in such a way can be implemented, for example, by means of a 3D capable display. In particular, the regions of the vehicle's surroundings that are captured only two-dimensionally are depicted on the virtual planes that are displayed in a spatial position that corresponds to a perspective that is to be depicted according embodiments of to the invention (in particular, relative to another virtual plane). This process offers the advantage of a three-dimensional and thus easy-to-understand and aesthetically advantageous depiction, without any need for the recording means to capture necessarily three-dimensional images, such as stereoscopic images.

As an alternative or in addition, the three-dimensional effect of the individual virtual areas and/or the vehicle model can also be depicted by an adaptive control of the image sharpness as a function of the image region inside at least one virtual plane. The portions of the virtual planes that are to be perceived as significantly nearer or deeper than a certain image depth are imaged, according to embodiments of the invention, less clearly than those image portions that correspond to this specific image depth. The human visual system has the ability to use these differences in the image sharpness to perform a three-dimensional interpretation of the scene. Embodiments of the invention provide that the adaptive control of the image sharpness of individual regions of the image planes can be used to highlight the perspective orientation of the corresponding images. The control of the image sharpness of the individual image regions can be achieved, for example, with the use of known digital sharpness filters, soft focus filters, or optical effects of a recording means.

In another embodiment of the method according to the invention, the virtual road plane is formed as a function of the three-dimensional shape of the road sections imaged thereon, and/or of the objects located thereon. In this way the sources of danger can be emphasized in a way that is especially simple and easy for the driver to understand. The contouring of the road planes can be visualized or highlighted, for example, by the deformation of a lattice structure superimposed on these planes, and/or by an additional geometric transformation on the virtual road plane, including the image imaged thereon.

Another embodiment adds, if desired, to the generated depiction one or more warning indicators that comprise the marking of a potential collision point of one or more parts of the vehicle, such as doors and/or flaps of the vehicle, with one or more objects in the surroundings of the vehicle. The warning indicators can be constructed, for example, as a graphic symbol, such as a three-dimensional action symbol. A warning indicator can be integrated into the depiction in such a way that the spatial reference between the object from which the danger emanates and the potentially endangered point of the vehicle is visualized. A warning indicator can be depicted, for example, at a point between an obstacle and the potentially endangered area of the vehicle (for example, a door of the vehicle) and, for example, at the point of potential damage, caused by inadvertently opening the door.

In an additional, especially preferred embodiment the generated depiction contains one or more trajectories and/or symbols that correspond to the future positions of at least one part of the vehicle. In this case the trajectories are based, in particular, on a pre-calculated or intended direction of movement of the vehicle. This depiction can comprise the depiction of a future position of a part of the vehicle, such as the depiction of the position of a chassis region at a point in time that lies in the near future. For example, the calculated future position of a bumper of the vehicle can be calculated at least at a point in time after, for example, one, two and three seconds. These positions can be calculated in advance in a very simple way assuming, for example, that the driver maintains his current driving style. The positions of the vehicle and/or the parts of the vehicle can be depicted in a way similar to the depiction of the different regions of the vehicle's surroundings.

In the depiction of the intended movement of the vehicle, the results of carrying out an automatic and/or semi-automatic method for moving, in particular for parking a vehicle, can be visualized.

In addition to the described method for informing the occupant of a vehicle, embodiments of the invention additionally comprise a suitable information system comprising an image processing unit, which processes at least two images that are generated by the recording means of the vehicle and contain a variety of road sections of the road plane in the surroundings of the vehicle, in such a manner that the at least two images are displayed on a display unit in the interior of the vehicle. The information system is characterized in that, when working, the image processing unit generates a depiction in which the at least two images are imaged on a virtual road plane, wherein the virtual road plane is displayed in perspective.

In this context the information system can be implemented in that each of the above-described and preferred embodiments of the method according to the invention can be carried out with this system. In addition, embodiments of the invention relate to a vehicle, in particular a motor vehicle, which contains the just-described information system. The image processing unit can be combined with the recording means or with the display unit so as to form a single device.

Preferred embodiments of the invention are described below with reference to the accompanying drawings. The results of this description are additional details, preferred embodiments and further developments of the invention. A plethora of changes and modifications are possible within the scope of the invention without departing from the scope of the invention or its equivalents. In particular, the inventive system or the corresponding method can be designed differently owing to the legal provisions or the country-specific specifications.

The described exemplary embodiments, embodiments and further developments can be used both individually and also in any combination with each other (unless otherwise stated and/or technically infeasible) and are advantageous.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1A is a schematic drawing of the side view of a motor vehicle that shows the image processing unit and the display unit within the vehicle;

DETAILED DESCRIPTION OF THE DRAWINGS

Figure 1:
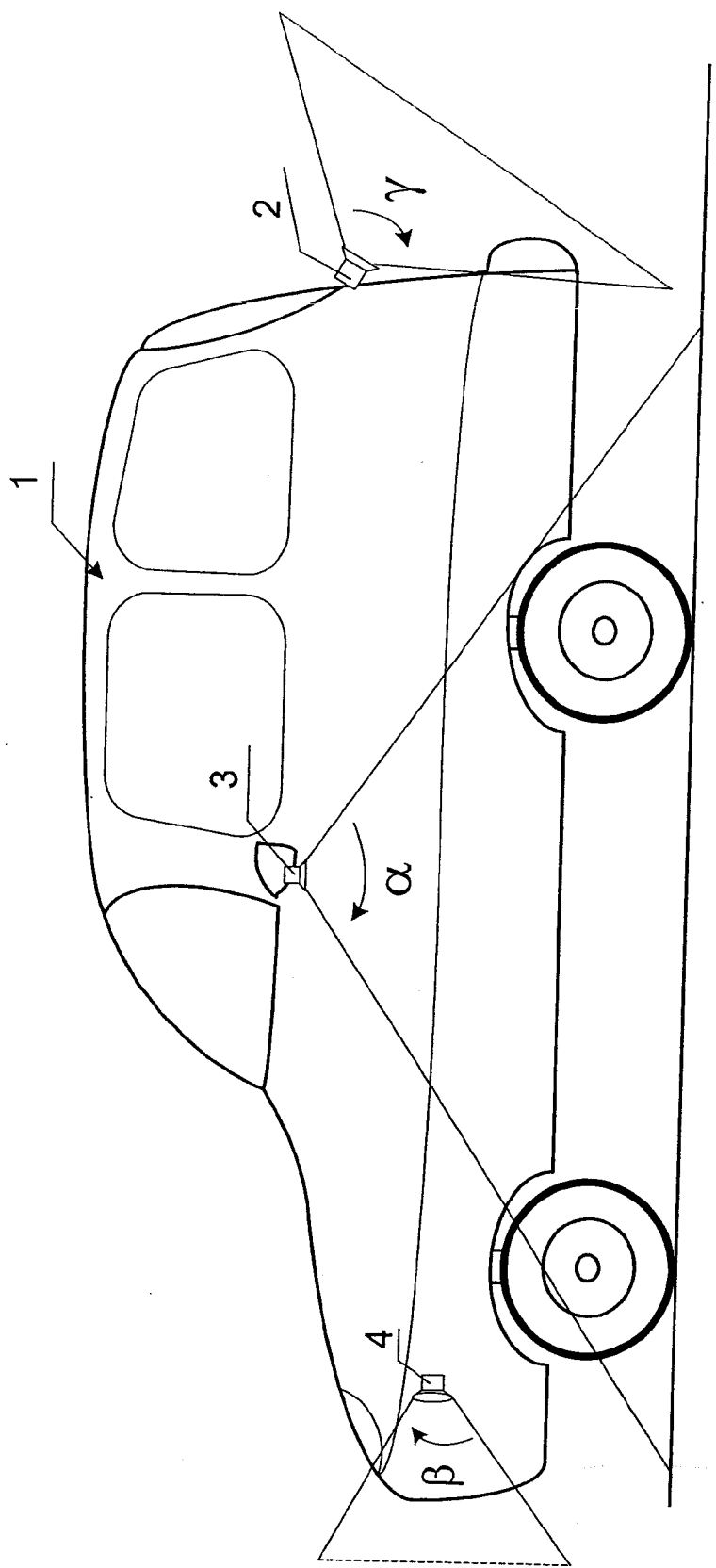
FIG. 1 is a schematic drawing of the side view of a motor vehicle comprising an arrangement of near field cameras and their fields of view.

FIG. 1 shows a motor vehicle 1 comprising a plurality of near field cameras 2, 3 and 4. In this embodiment the near field camera 2 represents a back-up camera, of which the angle of view is marked y. The back-up camera 2 monitors the rear region of the motor vehicle. In this case a corresponding image of the rear road region can be displayed on a display unit (not illustrated) in the form of a display in the vehicle cockpit. In this way the driver of the vehicle can monitor the distance of the rear objects when maneuvering, for example, when parking, and can, thus, avoid a collision.

Furthermore, there are so-called top view cameras 3, which may be integrated into the side view mirrors. In FIG. 1, only one of the top view cameras 3 is displayed on the left side of the vehicle. The angle of this camera's field of view is labeled α. The top view camera 3 serves to capture the road region on the longitudinal side of the vehicle 1. Analogous to the back-up camera 2, the road region captured with the top view camera 3 can be displayed on the display unit in the interior of the motor vehicle. In the front region of the motor vehicle two additional near field cameras 4 are provided on the left and the right side. In this case they are so-called side view cameras, which monitor the front left and right road region, and their images can also be depicted on the display unit in the interior of the vehicle. Once again FIG. 1 shows only the side view camera 4 provided on the left side of the vehicle 1. This camera's angle of the viewing field is labeled β. The side view cameras 4 serve, in particular, to record the regions of the vehicle's surroundings that cannot be seen directly by the driver because of a certain traffic situation, such as the detection of objects that are located laterally to the front vehicle region, for example, upon leaving a garage. FIG. 1A shows a schematic of the display unit 5 and the image processing unit 8 arranged within the vehicle 1.

Figure 2:
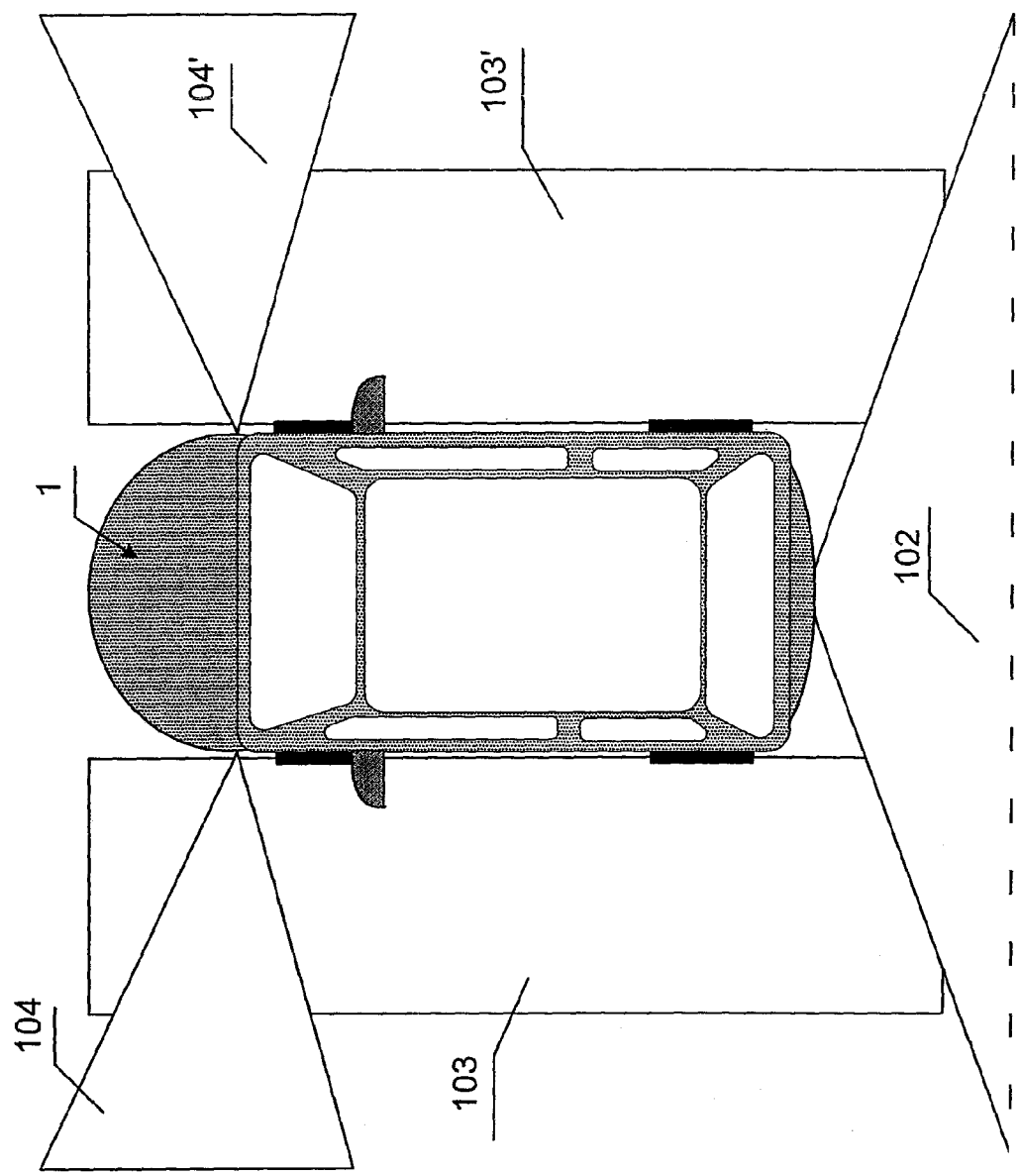
FIG. 2 is a top view of the motor vehicle from FIG. 1 with the fields of view of the near field cameras depicted.

FIG. 2 is a top view of the vehicle 1 from FIG. 1. This top view shows the expansion of the cameras' fields of view in the road plane. The viewing field of the back-up camera 2 is labeled 102, the viewing fields of the two top view cameras 3 are labeled 103 and 103' respectively, and the viewing fields of the side view cameras 4 are labeled 104 and 104' respectively. The individual cameras record a large region of the surroundings of the vehicle. In this respect the top view cameras 3 are wide-angle cameras with recording angles in the downward direction and to some extent running diagonally to the rear. The viewing field covers the left and/or the right side of the road next to the vehicle. For the purpose of depicting on the display unit in the interior of the vehicle, the image from these cameras is formed with the use of geometric transformation, so that the result is a virtual view running diagonally to the front with respect to the corresponding road regions. This virtual view is complemented with symbolic place holders for a better orientation, such as with a graphic model of the motor vehicle from the same perspective from which the virtual road plane is generated, and is displayed on the display unit. Furthermore, the virtual road plane can be complemented with the images that are taken by the back-up camera 2 and transformed by a transformation into the suitable perspective by means of the images of the top view cameras 3.

Figure 3:
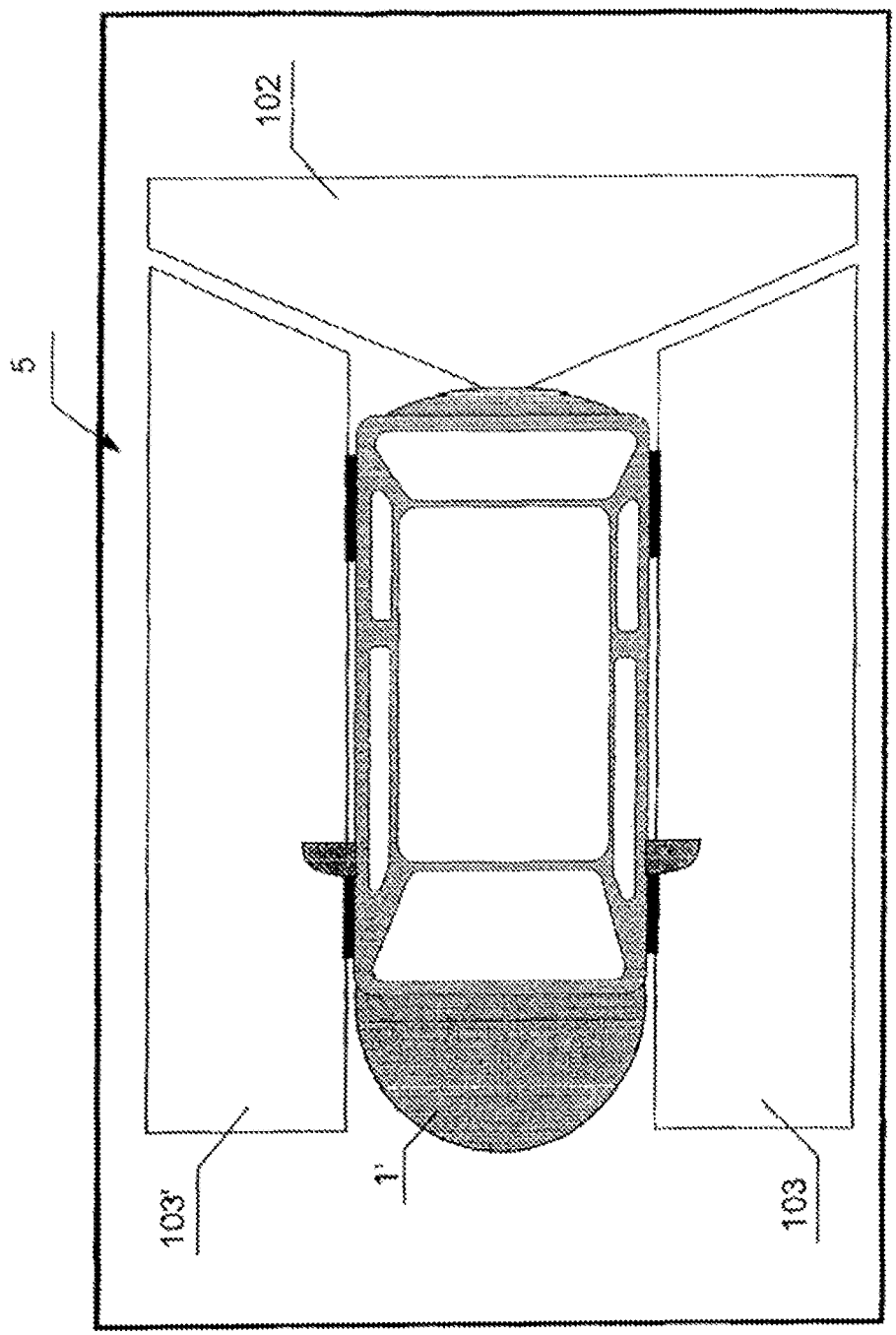
FIG. 3 is a related art depiction of a top view of a vehicle on a display unit in the interior of the vehicle.
Figure 4:
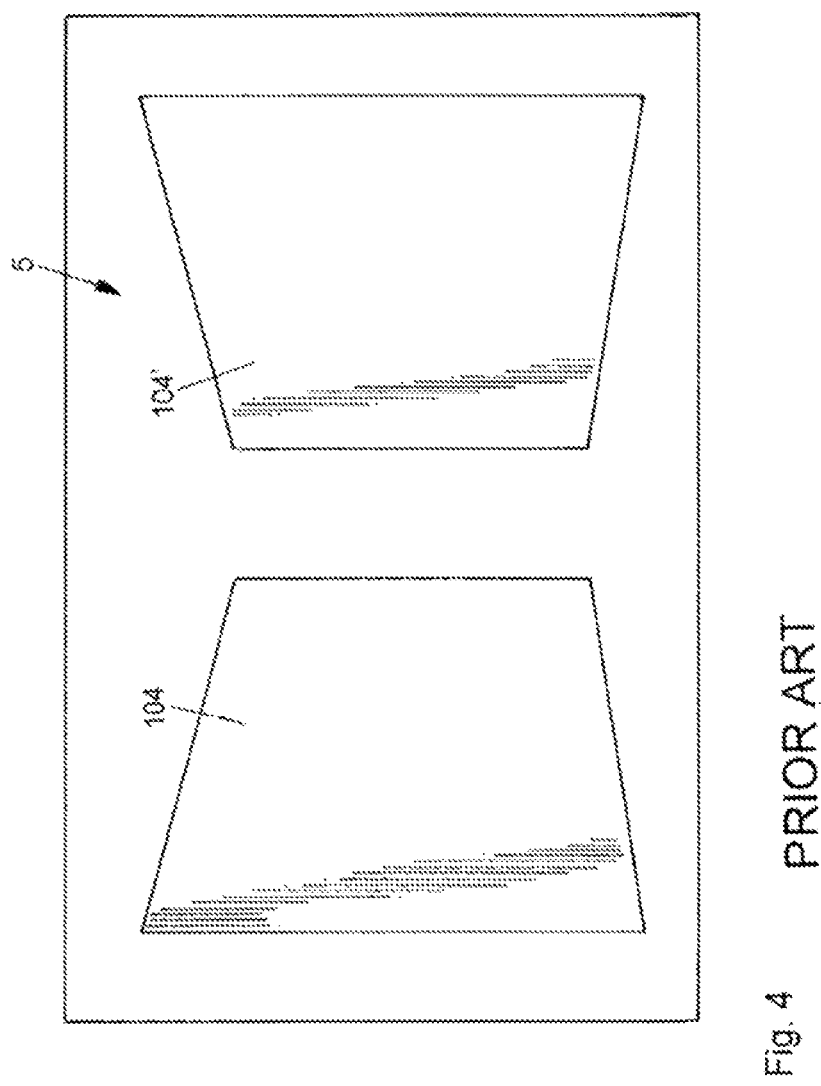
FIG. 4 is a related art depiction of a perspective view of a vehicle on a display unit in the interior of the vehicle.

In the case of the method shown in FIG. 3 and known from the related art, such a depiction on a display unit 5 shows the images of the top view cameras 3 and the back-up camera 2. In this case the display area of the display unit runs transversely to the direction of travel. That is, the longitudinal edges of the display unit lie essentially transversely to the direction of travel. In FIG. 3 the symbolically depicted vehicle outline bears the reference numeral 1'. The two side regions recorded by the top view cameras 3 are provided with the reference numerals 103 and 103' respectively, and the region recorded with the back-up camera 2 bears the reference numeral 102. In this case the reference numerals that are used are in conformity with the corresponding fields of view according to FIG. 2. As described above, the individual image regions involve the suitably transformed images, as a result of which a virtual top view from the top is generated. The depiction in FIG. 3 does not include the images of the two side view cameras 4. These images are usually depicted in a different display mode on the display area of the display unit. In this case FIG. 4 shows such a display mode. In conformity with the corresponding fields of view according to FIG. 2, the recorded image regions of the side view cameras in FIG. 4 bear the reference numerals 104 and 104' respectively.

The fundamental, well-known problem in vehicles with a plurality of installed cameras is that, in particular, an inexperienced user can relate the respective images only with considerable effort and often incorrectly to the real environment. Even the assignment of directions is difficult. It is also difficult for the user to predict, for example, the direction and speed of the objects in the camera images, when the driver is executing a specific driving action. In contrast, if the camera images are depicted in a switchable manner and/or one after the other on the display, the driver is also overwhelmed. The driver is not expecting the appearance of an obstacle that is not momentarily depicted. In particular, the related art depiction on the display unit 5 according to FIG. 3 has the drawback that an image extending transversely to the direction of travel is generated by the rotated depiction of the vehicle and/or the regions recorded by the cameras. In particular, the driver has to perform continuously a mental "recalculation of the coordinates," in order to assign the direction of travel extending transversely on the display unit to the actual direction of travel.

Of course, in order to solve the above problem it is conceivable that one can rotate the respectively depicted image of the vehicle in FIG. 3 by 90° into a vertical position. This process makes it easier to assign the surroundings of the vehicle, which the camera records, to the direction of travel, because the depicted direction of travel coincides with the actual direction of travel. However, due to the oblong shape of the screen, which currently exhibits almost a movie format, such a vertical display is very small. In order to enlarge the depiction, the height of the vehicle could be compressed, if desired, but such a depiction has an unnatural look.

Another drawback associated with the related art lies in the fact that a driver has to switch back and forth between the different depiction modes, in particular between the depiction of the vehicle, as seen in a top view according to FIG. 3, and the perspective view based on the side view cameras according to FIG. 4. The result of this switching between several depiction modes is that the driver often has to think his way into new perspectives and/or physical installation positions of the cameras, a task that often irritates the driver. Thus, in some cases the driver is not always aware of the perspective from which he is seeing a certain depicted image on the display unit, or the solid angles that may not be covered by the cameras. Therefore, there is a need to generate on the display unit of the motor vehicle a mode of depiction that limits the number of depictions to the benefit of their universality and clarity.

The operating principle of the invention is explained in detail below with reference to several embodiments. In this case the operating principle can be applied to any system that records the vehicle's surroundings for the driver. That is, embodiments of the invention are not limited to the above-described camera images, but rather can be applied to images of any imaging device, where the term "imaging device" has already been defined in detail above. In particular, the images of imaging devices may include both camera images (also images recorded by infrared cameras) and synthetic images (optionally also with surroundings that are depicted in symbolic form), which are generated, for example, by scanning the surroundings by means of suitable sensor devices, such as radar and/or lidar devices and the like. The synthetic image or a portion of the image can also be generated from data from ultrasonic sensors. In one advantageous embodiment the method of embodiments of the invention that are described below are applied to existing cameras and/or surround sensing devices. The generation of the images from, for example, the sensor data of recording means can be implemented preferably with the hardware of the recording means, but also completely or partially in the image processing unit.

The embodiments of the invention that are described below solve the engineering object of generating a consonant depiction of several perspectives for at least one vehicle occupant, such as the driver and/or the passenger. In this case the depiction is self explanatory with respect to the depicted perspectives, especially with respect to the assignment of objects depicted in the image regions to the real parts of the vehicle's surroundings and/or relative to at least one occupant. Furthermore, there is no need to implement an unreasonable number of switching operations and the corresponding expensive man-machine interface (MMI).

The below-described embodiments are characterized by the fact that a depiction of the images, of which the perspective is transformed and which show in each case a portion of the surroundings of the vehicle, is imaged on a virtual road plane, of which the perspective is arranged relative to the screen area. In this respect the virtual road plane is imaged as seen diagonally from the top and directed towards the front part of the vehicle. The virtual road plane is constructed as a mask that forms the shape and/or the boundaries of the respective portions of the image.

Figure 5:
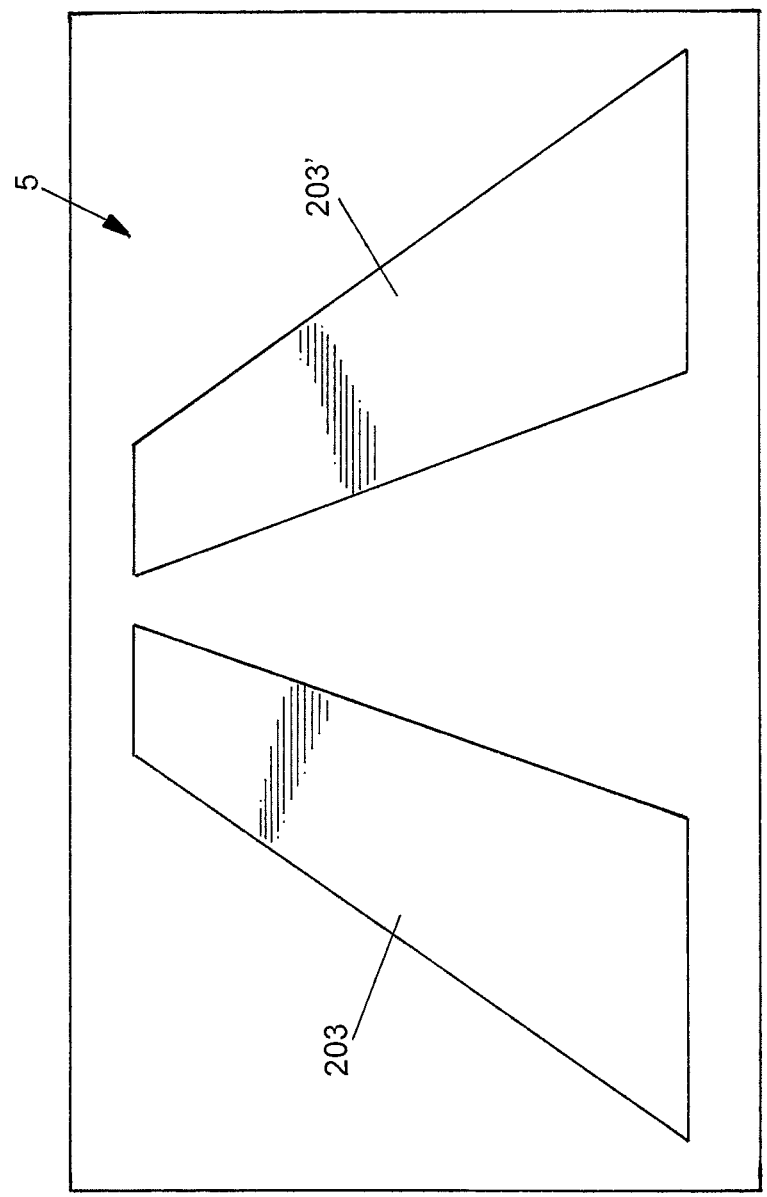
FIG. 5 shows a display unit with a depiction according to embodiments of the invention.

FIG. 5 shows a display unit 5 comprising such a depiction according to embodiments of the invention. In FIG. 5 two non transformed images 203 and 203' of road sections recorded by top view cameras are displayed. In this way an intuitively understandable "quasi-three-dimensional depiction" of the road sections that can be depicted on the related art display is obtained from the images of the road sections that were originally recorded two-dimensionally.

Figure 6:
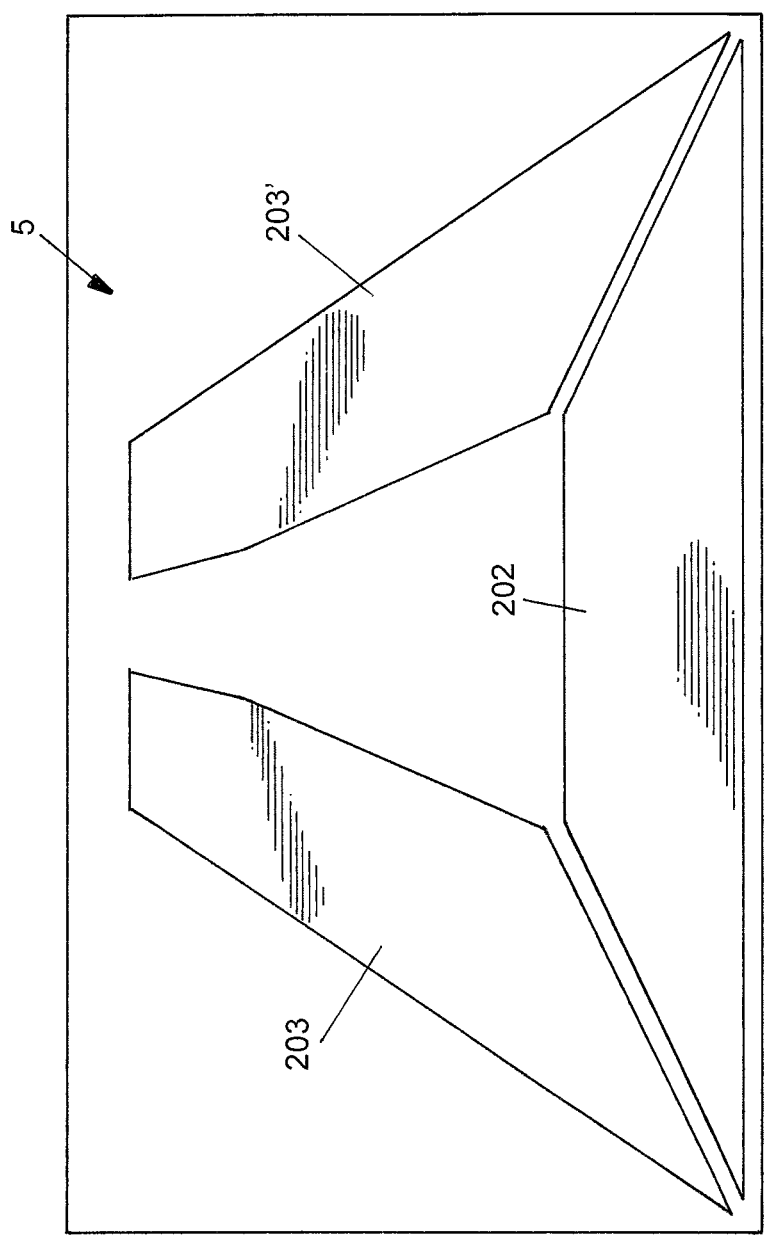
FIG. 6 shows a display unit with another depiction according to embodiments of the invention.

The depiction mode, shown in FIG. 5, is complemented with an image that is taken by a back-up camera and is converted into the same perspective. Such a depiction mode is shown in FIG. 6. In addition to the transformed image regions 203 and 203', which image the side regions of the vehicle, a rearwards region 202 is additionally shown. Preferably several images of individual imaging devices are used to reconstruct the plane of the road. Embodiments of invention offer the practical advantage that the images can be arranged, without minimizing and/or compression, on a display unit (as shown in FIGS. 5 and 6) which is expanded transversely to the direction of travel. In a suitable geometric transformation into a perspective virtual road plane, the individual images fit well on the display area and are perceived as natural, owing to the depicted perspective on the two-dimensional screen. The generated virtual road plane can be also be curved, if desired, or rather can be depicted as curved.

One embodiment of the method according to the invention can be applied to the image of the recording means that record the region of the road under the vehicle. Such recording means can be constructed, for example, as a sensor for detecting the ground relief, such as a camera based on the so-called time-of-flight technology. In this case the image that is taken by these recording means and that can be prepared as a synthetic image is imaged on the above-described virtual road plane.

Figure 7:
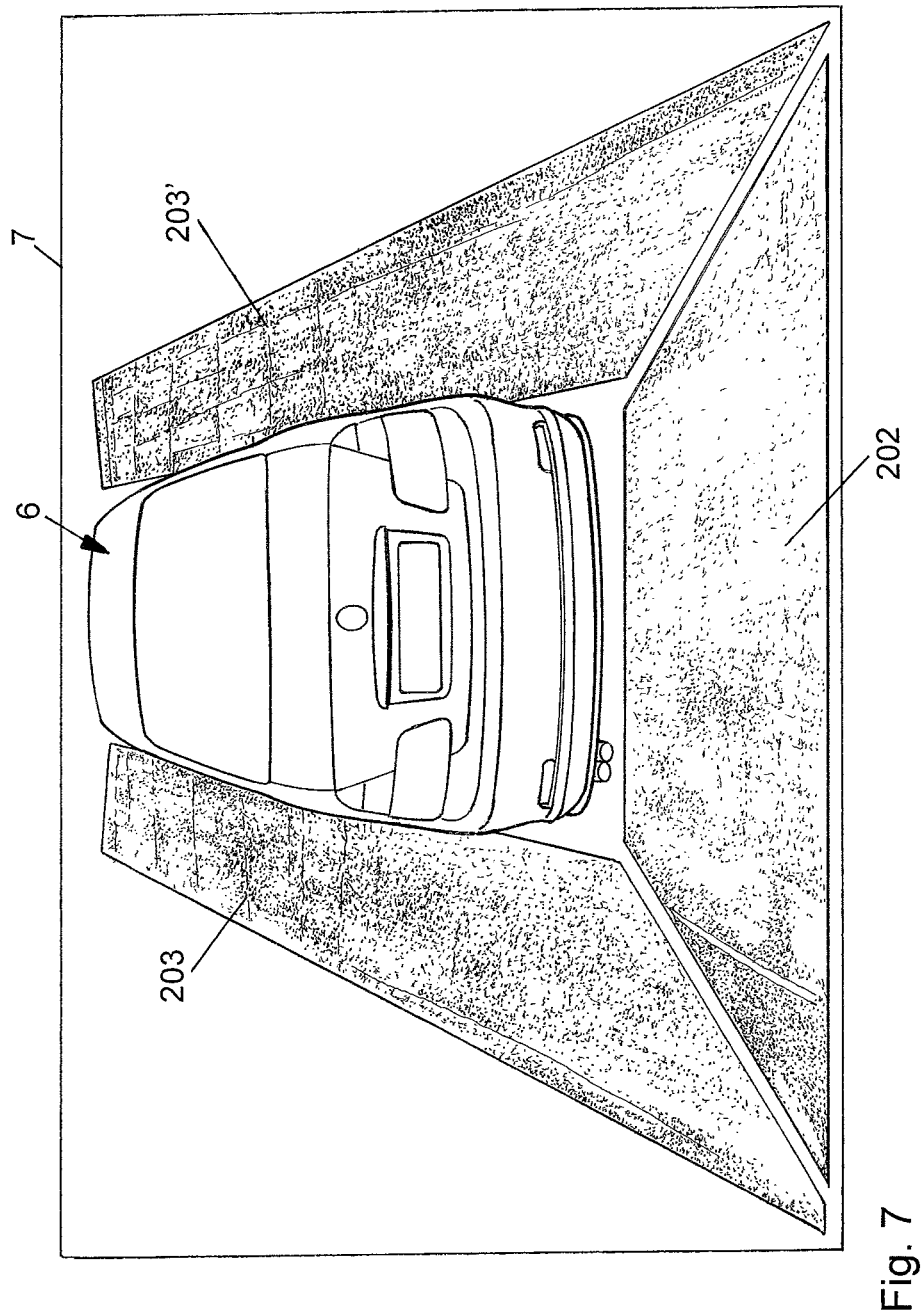
FIG. 7 shows a display unit with a depiction that includes a model of the vehicle according to embodiments of the invention.

In an especially preferred embodiment of the method according to the invention, the depiction is carried out in such a way that the model of the surroundings that is displayed in the virtual road plane is complemented with a graphic vehicle model in such a way that the vehicle model is depicted from the same perspective as the imaging of the road plane. This process helps the user to clearly understand the perspective depicted in the virtual road plane. At the same time the graphic vehicle model helps the user to detect a relative perspective and a relative position of obstacles relative to the parts of the vehicle. This approach gives the driver a spatial conception of the road, the objects in the surroundings of the vehicle, etc. in relation to his vehicle and/or to himself. Thus, the driver can estimate in a simple way the position of a specific object, such as an obstacle, a parking space boundary and other road lines, relative to his vehicle and its parts, such as the tire rims, doors and the like. FIG. 7 shows an embodiment of a depiction with such a vehicle model. In this case the vehicle model bears the reference numeral 6 and displays a perspective view of the vehicle from the rear. The driver recognizes very quickly from the imaging according to FIG. 7 how his vehicle relates to the depicted images 202, 203 and 203' of the surroundings. According to the depiction in FIG. 7, the driver receives information about the orientation and the size of the objects displayed in the individual images 202, 203 and 203'. In this case the frame of the display unit 7, as seen by the occupant of the vehicle, serves additionally as a reference for perceiving the generated depth effect.

The vehicle model is constructed as three-dimensional action graphics. In addition, the spatial perception is additionally enhanced by the spatially aesthetic depiction of the vehicle and/or the vehicle model 6. The vehicle model 6, depicted in the embodiment in FIG. 7, is preferably stored as a bit map (or several bit maps from various perspectives) in the image processing unit. As a result, this bit map does not have to be recalculated again for each perspective to be depicted. As an alternative the vehicle model 6 can also be generated and/or depicted by means of vector graphics and/or a simulation that changes preferably as a function of the perspective to be currently depicted.

Figure 8:
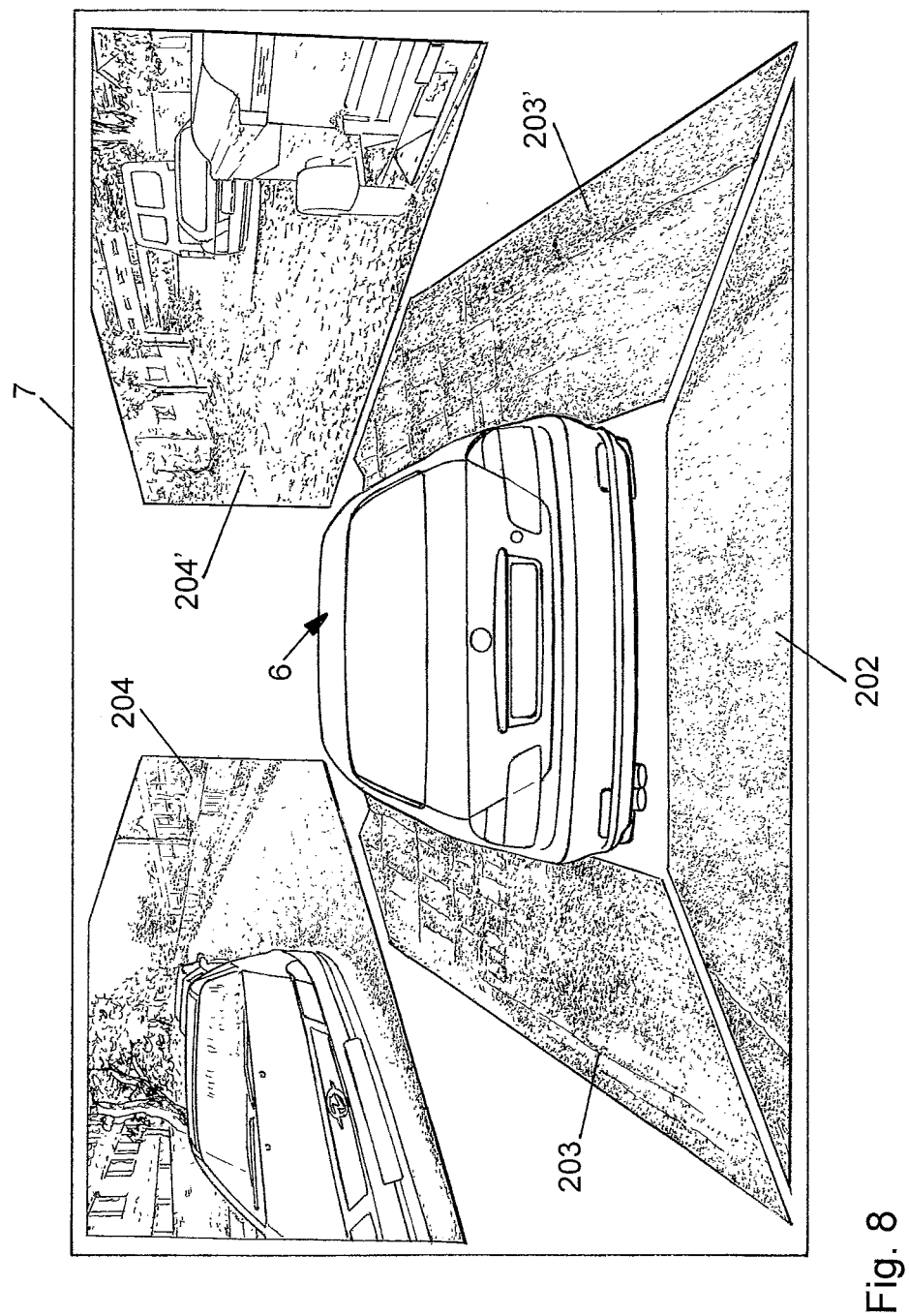
FIG. 8 shows a display unit with another depiction that includes a model of the vehicle according to embodiments of the invention.

In an additional, especially preferred embodiment, the virtual road plane is complemented with additional virtual planes. In particular, such planes are added that extend essentially perpendicular to the virtual road plane. This approach forms a virtual space that depicts the surroundings of the vehicle, preferably in combination with the vehicle model. In this case the additional planes are preferably such planes that depict a perspectively captured image region in the vehicle's surroundings. For example, the image regions that are recorded with the side view cameras 4 from FIG. 1 can be considered. These image regions are arranged in the lateral planes in such a perspective and/or spatial relation to the virtual road planes and/or the three-dimensional vehicle model that they correspond essentially to the directions from which the images of the lateral planes were recorded in relation to the vehicle by the imaging devices. This embodiment has the advantage that the driver understands at which angle to him and his vehicle the objects depicted in the image can be found and/or avoided. As a result, the spatial effect is reinforced. FIG. 8 shows a corresponding depiction with the regions 202, 203 and 203' of the virtual road plane and the vehicle model 6, as well as two lateral planes that are arranged on the left and the right of the vehicle. These planes are perpendicular to the virtual road plane, and the images 204 and 204' depicted therein are suitably transformed images that were recorded by side view cameras 4, as shown in FIG. 1.

In the depiction shown in FIG. 8, the normals of the lateral planes 204 and 204' are at such angles to the vehicle model 6 that they correspond approximately to the real spatial angles between the respective orientation of the imaging devices and the actual vehicle. In this way the depiction helps to explain to the driver the respective orientation and the recording direction of the cameras in relation to the vehicle.

Figure 9:
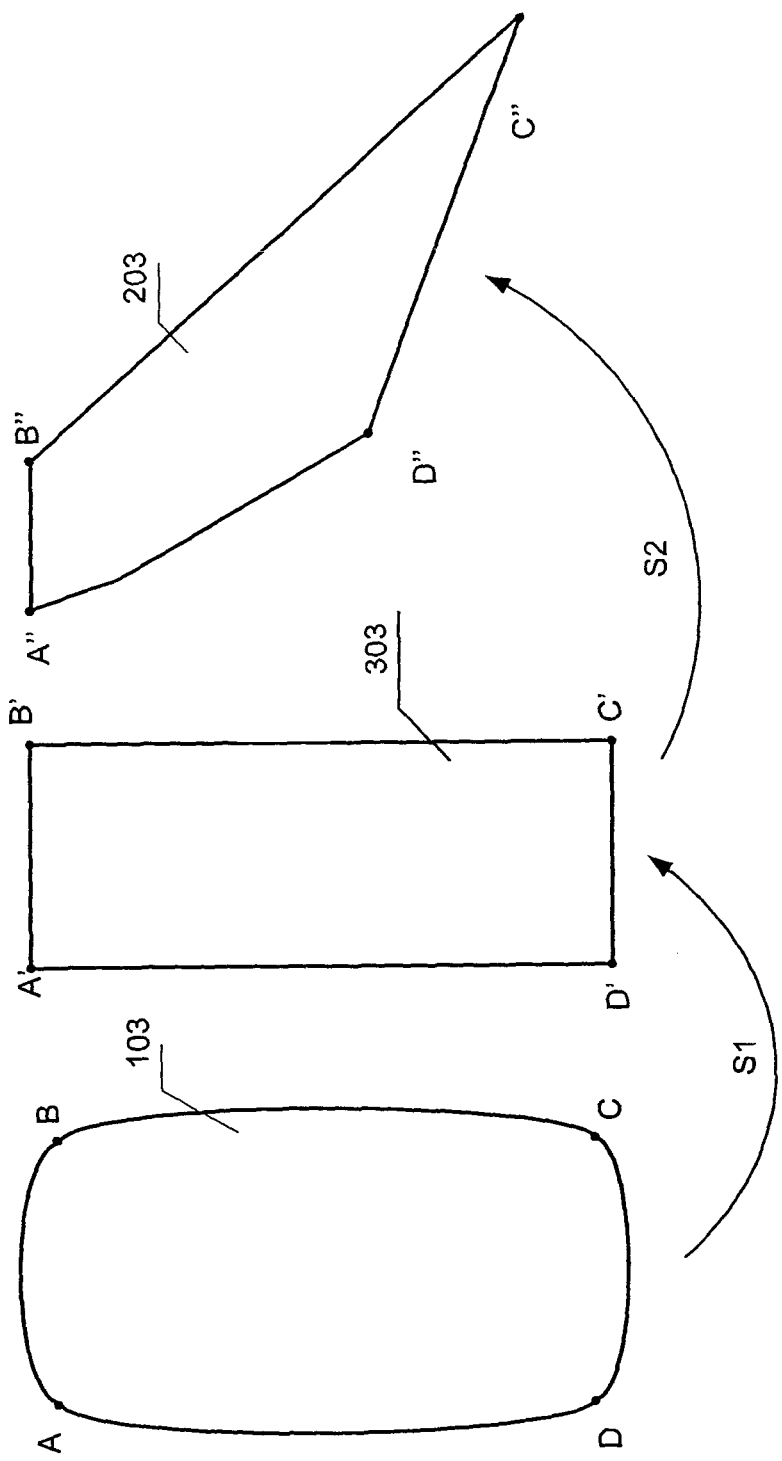
FIG. 9 is a schematic drawing of an embodiment of an image transformation for implementing the method according to embodiments of the invention.

A preferred embodiment of an image transformation for implementing the method according to the invention is explained below by means of FIG. 9. FIG. 9 shows the transformation of an originally cushion-shaped image 103 of a top view camera in the transformed image 203. One recognizes the cushion-shaped structure of the image region 103, where the corners of the cushion are marked A, B, C and D. The cushion-shaped contour is produced with the use of a wide-angle camera that delivers an optically distorted image of the recorded rectangular road region. In a first step S1, which is known from the related art, a suitable transformation corrects the original image 103, thus producing again the original rectangular shape of the image region. This shape of the image bears the reference numeral 303 and comprises the rectangular corners A', B', C', D'. At this point embodiments of the invention can transform the image region 303 through an additional geometric transformation into a suitably transformed image region 203 in accordance with a step S2. In this case a perspective is generated by means of the shape of the image region 203, which is constructed by means of a mask. The image region 203 resembles a trapezoid and comprises the corresponding corners A'', B'', C'' and D''. One recognizes that in the transformed image 203 the height of the image is significantly reduced. Therefore, the image also fits on the landscape display area of the display unit 7 shown in FIG. 5 and FIG. 6, and the result is a three-dimensional impression. Since the transformation according to step S1 and step S2 is clear, the image correction according to step S2 can be skipped according to embodiments of the invention. That is, the image 203 can be generated directly from the image 103 with the help of a transformation.

The preferred variant has the advantage that in implementing embodiments of the invention, there is no significant increase in the necessary computational power of the image processing unit.

The advantage of the depiction mode according to embodiments of the invention making use of the transformation explained with reference to FIG. 9 lies in that fact that this depiction, even though it looks quasi-three-dimensional and highly professional, can be generated in a simple way, as in the case of the related art imaging processes for correcting the original camera images with an obvious and clear transformation function, where the pixels and subpixels of the input images are assigned to the output image to be generated. Neither a 3D graphics processor nor an additional increase in the computational power of the image processing unit that is used for generating the images on the display unit is required. Preferably it is possible to set and/or change the intensity of the depth effect, if desired, also by means of the driver and/or as a function of the predetermined events.

Figure 10:
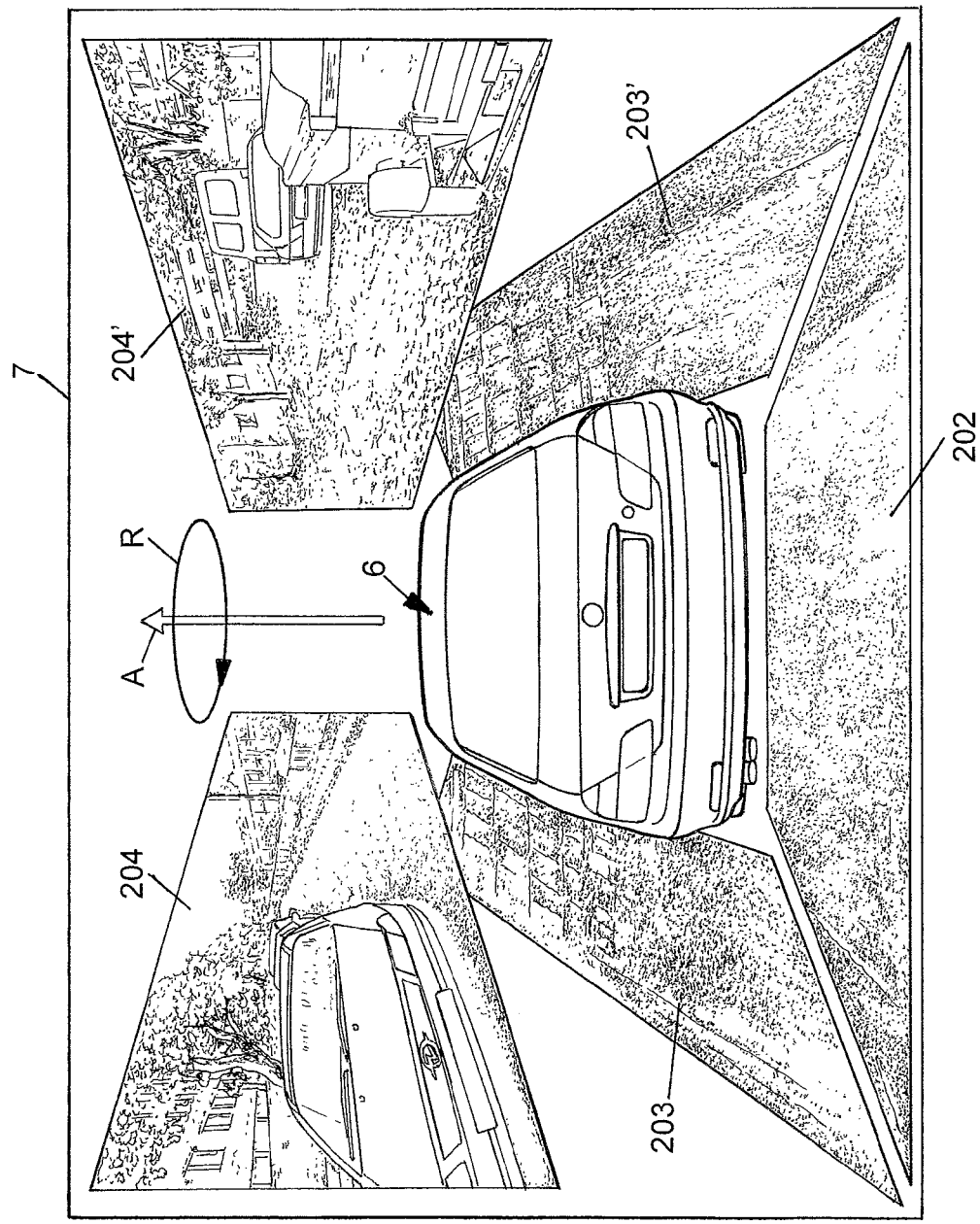
FIG. 10 shows a display area of a display unit in the interior of a motor vehicle, wherein the change in the depiction of the surroundings of the motor vehicle according to an embodiment of the invention is indicated.

In another advantageous embodiment of the method according to the invention, the generated depiction is rotated as a function of the predetermined events, such as the operating actions of the driver. As a result, the driver is provided with a virtual view of the surroundings from a different angle, in particular a laterally shifted angle. In this way it is possible to simulate, for example, a virtual flight running diagonally from the top. This virtual flight is easy to achieve, based on the inventive depiction mode, by changing the shape of the virtual road plane and the transformation parameters and/or by switching the cameras. In so doing, a virtual rotation of the whole space spanned by the image areas is generated, as a result of which the virtual viewing angle with respect to the whole scene changes as a function of the vehicle-specific criteria and/or according to the driver's request. This process uses, in particular, such a transformation of the images that the virtual viewing angle is changed without changing the perspective in the relationship between the individual planes that are representative of the vehicle's surroundings. In so doing, it is especially advantageous to rotate the virtual surroundings about a vertical axis of the vehicle model. As a result, the driver can view a specific part of the surroundings in detail and move virtually around his vehicle. FIG. 10 shows a depiction similar to FIG. 8, where FIG. 10 also shows a suitable vertical axis A with a corresponding direction of rotation R, about which the virtually depicted surroundings can be rotated in a preferred embodiment.

In particular, the above principle of changing the orientation of the virtual space makes it possible to show on demand a side view of the vehicle, such as the view, recorded with a top view camera, to the left of the vehicle together with the right region, recorded with a side view camera, in front of the vehicle and optionally with the right region, recorded with another side view camera, behind the vehicle. Similarly the views of the vehicle from the front can be generated together with the views of the two rear side view cameras.

In an especially advantageous embodiment of the method, the perspectives and/or the imaging size of the depiction according to embodiments of the invention can be changed by an operating action and/or as a function of a predetermined event. Thus, it is possible to achieve an especially advantageous zooming in on a view, in particular a virtual plane, which is selected by the user and/or affected by the event. In this case the zooming in on a virtual plane and/or a region of this plane can be connected to a perspective change. For example, a virtual plane of which previously the perspective had been significantly transformed, is depicted with a changed transformation, which has less or no perspective. When a predetermined condition no longer exists, the view can automatically return to the previous state and/or to the original state.

Especially advantageous is the use of the inventive method to assist the driver in parking and maneuvering operations. The method offers the driver a clear depiction, even during partially or totally automatic driving maneuvers. The method and/or the system based thereon can be automatically activated as a function of the predetermined criteria, such as the engagement of the reverse gear, the reduction in speed to a certain level, and/or the activation of an additional assistance system of the vehicle.

The operation of the orientation of the virtual space can be carried out by means of a rotate controller or another operating element in the vehicle.

The spatially aesthetic vehicle model offers the occupant of the vehicle the orientation with respect to the depicted viewing angle with respect to the vehicle's surroundings.

In another advantageous embodiment of the invention, the change in the orientation of the virtual space can also take place as a function of automatically detected and interpreted traffic situations. In this case the interpretation of the traffic situation can be executed, for example, by means of a navigation system. In particular, the interpretation of the traffic situation can depend on the presence of a side street, an exit and/or on whether it involves a maneuvering operation in a city parking garage or in the country on a field. Especially preferred is a change in the orientation of the virtual space in such a way that it is adapted to the presence of obstacles and/or to the risk of a collision that such obstacles present. For example, the change in the orientation of the virtual space can be a function of a surround sensing of the vehicle, for example based on ultrasonic sensors. In this case the space around the vehicle in the event of a potential collision is oriented in such a way that the driver can easily recognize the critical points.

In another advantageous embodiment of the invention, the change in the orientation of the virtual space in the surroundings of the vehicle can be constructed as a function of a vehicle-to-vehicle and/or vehicle-to-infrastructure communication. Then the presence of another road user and his position relative to the vehicle can be communicated wirelessly, for example, by means of the signal of an RFID chip, and in this way the virtual space is rotated to match, so that certain perspectives or objects contained therein or their position can be perceived in a better way. This better perception can be achieved by such a change in the perspective that shows the object, for example, in relation to the current direction of travel or specific parts of the vehicle. Similarly there is the possibility that the driver mounts an RFID chip, for example, on a specific place, such as in his garage. Then the readout of the RFID chip by a device of the vehicle signals to the vehicle that the virtual space should be oriented in a specific, optimized direction, such as optimized for driving into his garage, his garden and the like. Thus, the driver of a vehicle can acquire suitable RFID chips and place them, for example, on his property, so that his vehicle shows him, on driving through, at each part of his parking area and/or garage the desired perspective.

In addition, an RFID chip can be put into children's clothing, a baby carriage or a child's tricycle. In this way embodiments of the invention achieve the goal that especially when a child is located in the vicinity of the vehicle, the depiction of the surroundings of the vehicle is changed in favor of the visibility of the child.

Another advantageous embodiment of the invention can use photographic means for accentuating the depth effect. In photography the depth effect can be selected, inter alia, through the specific choice of objective lens and aperture. That is, it can be selected in such a way that the objects located before and after a certain distance from the objective lens are fuzzy. The method according to embodiments of the invention achieves the same effect in an artificial way from the desired depth effect and the respective virtual distance of certain regions or portions of areas. To this end, the depicted image sharpness of certain regions of the image area and/or the vehicle model is set by the viewer as a function of the depicted perspective and/or as a function of the virtual distances of the regions. The depth effect can also be intensified, as required, by additional filtering, in particular with digital sharpness filters. Furthermore, when the virtual space is rotated, the image sharpness is shifted to match, and its respective depth in the virtual space is accentuated as a function of the position of the virtual space.

As stated above, images that are generated by the method according to embodiments of the invention can be generated with any imaging device. It does not always have to involve camera images, but rather it is also possible to use images that are generated or modeled artificially from sensor data, such as from the data of a surround sensing of a parking and maneuvering system.

The method can be carried out in combination with a method for automatic or semi-automatic parking and maneuvering. This approach offers an occupant of a vehicle, in particular the driver, a better overview of the relevant parts of the vehicle's surroundings, for example, during an automatic or semi-automatic maneuver, in particular a parking operation.

In another advantageous embodiment of the invention, the depicted image can be stitched together through a synthesis of the images of a camera and a device for surround sensing. The surround sensing device that is used is, in particular, a device that captures the topography of the surroundings (the height and/or distance of each point and/or section of the area). The synthesis of the camera image and the image of the surround sensing device makes it possible to correctly record, in particular, the road profile and/or the height of the objects on the road, and to depict them through a distortion of the corresponding image regions. As a result, the display unit forms the virtual road plane as a virtual image area in conformity with the three-dimensional shape of the road and the objects located thereon. For example, a height difference in the road, which can be observed in the case of a curbstone edge, can be imaged in the corresponding areas of the depicted virtual image. In so doing, the curbstone edge is captured with the surround sensing device, and the virtual road area is formed at the corresponding spot. As an alternative, the curbstone edge can be depicted above the virtual road plane by means of symbolic graphics, such as semi-transparent graphics.

An additional advantageous embodiment of the method according to the invention superimposes a graphical indicator over the depiction according to embodiments of the invention in the event that obstacles that can cause damage on opening a door are detected. If, for example, there is a large stone on the road, an explicit indicator can appear in the three-dimensional depiction according to embodiments of the invention that a certain door should not be opened at this time, or should be opened only up to a certain opening degree. In this way the driver is suitably warned before opening the doors or flaps of the vehicle when there is a risk of incurring damage. Thus, the perspective depiction of the virtual road plane shows in a simple and intuitive way which objects can be a problem, in particular, for example, on opening the door, and how far and/or which door may be opened. The result is that the critical places exhibiting a potential risk of causing damage are clearly indicated, and at the same time the available options for avoiding this damage are provided.

The indicator of the regions that exhibit a potential risk of causing damage can be constructed, for example, as a door of the virtual vehicle that is marked in the depiction according to embodiments of the invention, or as a door that is opened only up to the maximum allowable opening degree. As an alternative, the depiction of the limit for opening the door can be displayed, for example, by means of a virtual post. In another embodiment the risk of damage caused on opening the rear flap upwards can also be shown, in order to prevent the rear flap from hitting the rear wall or the garage roof.

In another embodiment of the method according to embodiments of the invention, the distances from the dangerous obstacles can also be explicitly marked in the image as a demarcation of the passable and unpassable regions of the road. In particular, the curbstone edges can be automatically detected and marked additionally as such. In this way the distance from the tire rims during a parking maneuver can be monitored.

In an advantageous embodiment the predicted and/or recommended trajectories of the vehicle or the predicted trajectories of other road users can be calculated and depicted in the depiction. For example, a trailer maneuver can be recorded with a back-up camera, and the trajectory of the movement of the trailer coupling in relation to the trailer can be displayed in a three-dimensional form. The simulation of a trailer maneuver as a flat two-dimensional model is already known from the patent application DE 10 2004 008 928.0, where in this application the air suspension of the vehicle can be manipulated for automatic coupling of the trailer. The method, which is described in this patent application and wherein the movement of the trailer coupling in relation to the trailer is shown preferably in a top view, can be combined with the depiction according to embodiments of the invention in such a way that the trajectories of the movement of the trailer coupling relative to the trailer are shown quasi-three-dimensionally in a suitable perspective relative to the at least one virtual road plane.

The above-described embodiments of the method according to the invention exhibit a number of advantages. The quasi-three-dimensional depiction of the vehicle's surroundings makes it possible to achieve a display of these surroundings that largely fills the screen in wide format display units. In this case the driver immediately understands the direction from which the respective objects recorded by the imaging devices are coming. The driver can easily estimate the distances between the obstacles and the parts of the vehicle, as well as the directions and sizes of the obstacles.

Furthermore, when the vehicle is in motion, the objects move relative to each other on the display unit in the same direction as in the event that the driver were to look directly through the window and/or the front windshield of the vehicle. The method does not require any and/or requires only a few self-explanatory switching options.

Similarly the method according to embodiments of the invention can also be used to depict the surroundings of the vehicle for the passengers of a vehicle, in particular a limousine, a bus or an aircraft. In this case the depiction according to embodiments of the invention can be automatically activated, for example, on the infotainment display of the vehicle, especially when the vehicle has reached, for example, a parking position, and the passengers may step out. The depiction can be provided with additional superimposed symbols, which show, for example, a stepping out direction or a destination direction for the passengers upon leaving the vehicle.

The modeled surroundings can be imaged, for example, in the form of a road exhibiting an altitude profile, on the virtual road plane and/or an additional virtual plane. This feature is made possible, in particular, by means of a synthesis of camera images with sensor data. Similarly there is the possibility of marking the respective trajectories, which would lead, for example, to a potential collision, as such and the possibility of integrating them into the depiction according to embodiments of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for informing an occupant of a vehicle of the surroundings of the vehicle, the method comprising the acts of:
   generating at least two images, which contain different road sections of a road plane in the surroundings of the vehicle;
   processing the at least two images;
   generating a depiction in which the at least two images are depicted on a virtual road plane that is displayed in perspective; and
   displaying the depiction on a display unit in an interior of the vehicle.

2. The method as claimed in claim 1, wherein the virtual road plane is displayed in perspective according to at least one of a limiting shape of the virtual road plane or an arrangement of the at least two images in relation to each other.

3. The method as claimed in claim 2, wherein:
   the at least two images undergo a geometric transformation in order to depict the at least two images on the virtual road plane, and
   the geometric transformation is applied such that a perspective of the at least two images corresponds essentially to the perspective in which the virtual road plane is displayed.

4. The method as claimed in claim 1, wherein:
   the depiction includes a representation of the vehicle,
   a perspective in which the representation of the vehicle is displayed corresponds essentially to the perspective in which the virtual road plane is displayed,
   the perspective in which the representation of the vehicle is displayed and the perspective in which the virtual plane is displayed correspond to a same virtual viewing point, and
   a position of the representation of the vehicle relative to the virtual road plane corresponds essentially to an actual position of the vehicle relative to the road plane.

5. The method as claimed in claim 1, wherein:
   the depiction includes at least one additional virtual plane, which is different from the virtual road plane,
   a part of the surroundings of the vehicle is depicted on the at least one additional virtual plane,
   the at least one additional virtual plane is displayed as standing essentially perpendicularly to the virtual road plane,
   the part of the surroundings of the vehicle undergoes a geometric transformation in order to depict the part of the surroundings of the vehicle on the virtual road plane, and
   the geometric transformation is applied such that a perspective of the part of the surroundings of the vehicle corresponds essentially to a perspective in which the at least one additional virtual plane is displayed.

6. The method as claimed in claim 5, wherein a correlation between perspectives of the at least one additional virtual plane and the virtual road plane corresponds essentially to a correlation between perspectives of the surroundings of the vehicle and a predetermined viewing point.

7. The method as claimed in claim 5, wherein:
   the depiction includes a representation of the vehicle, and
   a correlation between perspectives of the at least one additional virtual plane, the virtual road plane, and the representation of the vehicle corresponds essentially to a correlation between perspectives of the surroundings of the vehicle and a predetermined viewing point.

8. The method as claimed in claim 5, further comprising the act of changing at least one of the perspective in which the virtual road plane is displayed or the perspective in which the at least one additional virtual plane is displayed as a function of at least one of current odometric data of the vehicle or a driving intention of a driver of the vehicle based on at least one action of the driver.

9. The method as claimed in claim 5, further comprising the act of changing at least one of the perspective in which the virtual road plane is displayed or the perspective in which the at least one additional virtual plane is displayed as a function of a traffic situation while the vehicle is being operated.

10. The method as claimed in claim 9, further comprising the act of changing the depiction such that a virtual viewing angle, which is generated by the depiction with respect to at least one of the virtual road plane or the at least one additional virtual plane, is changed without changing a correlation between perspectives of the planes contained in the depiction or a correlation of the images depicted on the planes.

11. The method as claimed in claim 10, wherein
   the depiction includes a representation of the vehicle, the virtual road plane is at least one of rotated about an axis that runs vertically to the virtual road plane or tilted with respect to the axis that runs vertically to the virtual road plane, and a correlation between perspectives of the virtual road plane, the at least one additional virtual plane, and the representation of the vehicle remains essentially unaffected.

12. The method as claimed in claim 1, wherein an actual position of the vehicle in relation to the road sections is depicted in the depiction.

13. The method as claimed in claim 1, wherein a depth effect perceived by a viewer within the vehicle is at least one of displayed in the depiction or changed as a function of a traffic situation while the vehicle is being operated.

14. The method as claimed in claim 1, wherein the virtual road plane is formed as a function of at least one of a three-dimensional shape of the road sections or objects located on the road sections.

15. The method as claimed in claim 1, wherein the depiction includes at least one warning indicator that includes a marking of a potential collision point of at least one part of the vehicle with at least one object in the surroundings of the vehicle.

16. The method as claimed in claim 1, wherein the depiction includes at least one trajectory, which is depicted in the perspective of the virtual road plane and indicates a predicted future direction of movement of at least one of the vehicle or at least one object in the surroundings of the vehicle.

17. An information system for informing an occupant of a vehicle of the surroundings of the vehicle, the information system comprising:
   a recording unit that generates at least two images, which contain a plurality of road sections of a road plane in the surroundings of the vehicle;
   an image processing unit that processes the at least two images and generates a depiction in which the at least two images are depicted on a virtual road plane that is displayed in perspective; and
   a display unit that is arranged in an interior of the vehicle and displays the depiction.

18. The information system as claimed in claim 17, wherein:
   the depiction includes at least one additional virtual plane, which is different from the virtual road plane,
   a part of the surroundings of the vehicle is depicted on the at least one additional virtual plane,
   the at least one additional virtual plane is displayed as standing essentially perpendicularly to the virtual road plane,
   the part of the surroundings of the vehicle undergoes a geometric transformation in order to depict the part of the surroundings of the vehicle on the at least one additional virtual road plane, and
   the geometric transformation is applied such that a perspective of the part of the surroundings of the vehicle corresponds essentially to a perspective in which the at least one additional virtual plane is displayed.

19. A vehicle comprising an information system for informing an occupant of a vehicle of the surroundings of the vehicle, the information system comprising:
   a recording unit that generates at least two images, which contain a plurality of road sections of a road plane in the surroundings of the vehicle;
   an image processing unit that processes the at least two images and generates a depiction in which the at least two images are depicted on a virtual road plane that is displayed in perspective; and
   a display unit that is arranged in an interior of the vehicle and displays the depiction.

20. The vehicle as claimed in claim 19, wherein:
   the depiction includes at least one additional virtual plane, which is different from the virtual road plane,
   a part of the surroundings of the vehicle is depicted on the at least one additional virtual plane,
   the at least one additional virtual plane is displayed as standing essentially perpendicularly to the virtual road plane,
   the part of the surroundings of the vehicle undergoes a geometric transformation in order to depict the part of the surroundings of the vehicle on the at least one additional virtual road plane, and
   the geometric transformation is applied such that a perspective of the part of the surroundings of the vehicle corresponds essentially to a perspective in which the at least one additional virtual plane is displayed.

* * * * *